United States Patent
Zihlmann

(10) Patent No.: US 7,799,400 B2
(45) Date of Patent: Sep. 21, 2010

(54) MULTI-LAYERED PLASTIC BODY FOR MEDICAL APPLICATIONS

(75) Inventor: Rudolf Zihlmann, Langnau (CH)

(73) Assignee: Roche Diagnostics International AG, Steinhausen (CH)

( * ) Notice: Subject to any disclaimer, the term of this patent is extended or adjusted under 35 U.S.C. 154(b) by 201 days.

(21) Appl. No.: 12/122,814

(22) Filed: May 19, 2008

(65) Prior Publication Data

US 2008/0286575 A1 Nov. 20, 2008

Related U.S. Application Data

(63) Continuation of application No. 10/798,971, filed on Mar. 11, 2004, now Pat. No. 7,374,802, which is a continuation of application No. PCT/CH02/00464, filed on Aug. 26, 2002.

(30) Foreign Application Priority Data

Sep. 12, 2001 (DE) ................ 101 44 892

(51) Int. Cl.
- *B29D 22/00* (2006.01)
- *B29D 23/00* (2006.01)
- *B32B 1/08* (2006.01)

(52) U.S. Cl. ............... 428/36.91; 428/35.7; 264/328.8; 206/528; 604/96.01; 604/524; 604/403

(58) Field of Classification Search ........... 428/34.1, 428/35.7, 36.6, 36.7, 36.9, 36.91, 220; 206/528; 604/96.01, 524, 403; 264/328.8, 328.13, 264/328.14, 255

See application file for complete search history.

(56) References Cited

U.S. PATENT DOCUMENTS

| 4,212,299 | A | | 7/1980 | Yokokoji et al. |
|---|---|---|---|---|
| 5,356,709 | A | | 10/1994 | Woo et al. |
| 5,371,124 | A | | 12/1994 | Cooke |
| 5,407,713 | A | | 4/1995 | Wilfong et al. |
| 5,532,030 | A | | 7/1996 | Hirose et al. |
| 5,562,127 | A | | 10/1996 | Fanselow et al. |
| 5,637,408 | A | | 6/1997 | Oenbrink et al. |
| 5,789,046 | A | | 8/1998 | Mueller |
| 6,059,751 | A | * | 5/2000 | Ostapchenko et al. .. 604/103.06 |
| 6,178,832 | B1 | | 1/2001 | Mathur et al. |

FOREIGN PATENT DOCUMENTS

| DE | 44 10 875 A1 | 10/1995 |
|---|---|---|
| DE | 44 28 414 A1 | 5/1996 |
| DE | 694 20 861 T2 | 2/2000 |
| EP | 0 734 316 | 12/1994 |
| EP | 0 729 761 A2 | 9/1996 |
| JP | 7178884 | 7/1995 |
| JP | 7276586 | 10/1995 |
| JP | 11129413 | 5/1999 |
| WO | WO 00/61370 | 10/2000 |

* cited by examiner

*Primary Examiner*—Michael C Miggins
(74) *Attorney, Agent, or Firm*—Dorsey & Whitney LLP

(57) ABSTRACT

A multi-layered plastic body for containing, storing or conducting a medical, diagnostic, pharmaceutical, cosmetic or other product, the plastic body including a first layer made of a stress fracture resistant plastic material, and at least a second layer adjacent to the first layer and made of a plastic material exhibiting a lower resistance to stress fractures than the first plastic material. The invention encompasses a suitable method of making the body.

19 Claims, 2 Drawing Sheets

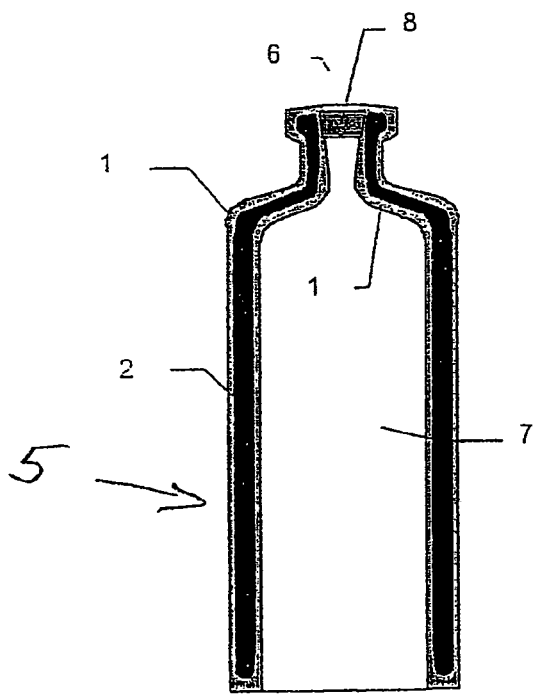
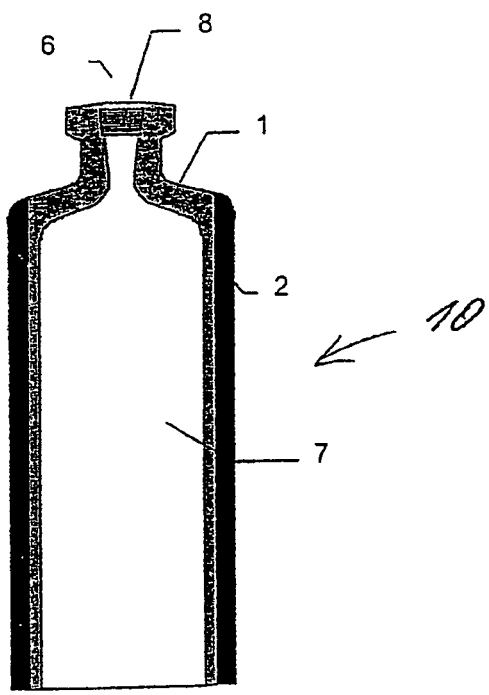
Fig. 3     Fig. 4
Fig. 5
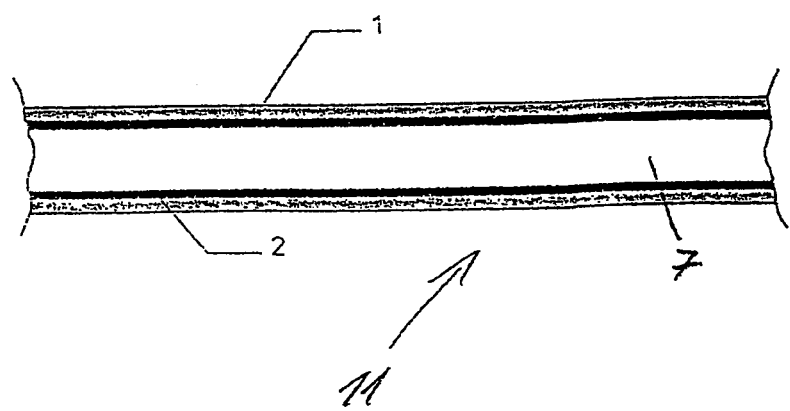

MULTI-LAYERED PLASTIC BODY FOR MEDICAL APPLICATIONS

CROSS-REFERENCE TO RELATED APPLICATION(S)

This application is a continuation of U.S. Application Ser. No. 10/798,971, filed Mar. 11, 2004, now issued as U.S. patent Ser. No. 7,374,802 on May 20, 2008, which is a continuation of International Application No. PCT/CH02/00464, filed on Aug. 26, 2002, which claims priority to German Application No. 101 44 892.9, filed on Sep. 12, 2001, the entire contents of both of which are incorporated herein by reference.

BACKGROUND

The present invention relates to devices or structures for containing and handling material, including medical, diagnostic, pharmaceutical or cosmetic substances, and to methods for making such devices or structures.

In some embodiments, the present invention relates to a multi-layered plastic body for handling medical, diagnostic, pharmaceutical and cosmetic products. Primarily, the plastic body serves to store or conduct fluid products including gelatinous products or is provided for storing or conducting the same.

An array of plastics have the property that they form fractures when under mechanical stresses and when acted on by a fluid, i.e., a liquid, gas or gel, wherein the fractures can cause components formed from such plastics to fail. The mechanical stresses may be caused by an external force acting on a component and/or by internal stresses. As a rule, the fluid interacts purely physically with the plastic, fractures only forming if the plastic material in question is under tensile stress. The tensile stress can be caused by an external force or in particular by internal stresses, e.g., frozen-in expansions and transverse stresses. This behaviour is also known by the term stress fractures or as environmental stress cracking (ESC). The fluid acting on the plastic can be a product to be conducted or stored or a fluid from the external environment of the plastic body, for example alcohol, or a component of a fluid, for example atmospheric oxygen, or other environmental substance, for example sebaceous matter. In the former case, the plastic body is acted on from within, and in the latter case from without. In most applications or uses, the plastic body is acted on from within and from without in conjunction, wherein, in many applications, one of these actions is more critical for the formation of fractures, wherein the focus can be on preventing or at least impeding the same.

Containers, filters, conduit systems and other simple catheters in medical, pharmaceutical or diagnostic applications, though also in cosmetic applications, generally have to fulfil a number of different functions simultaneously. In particular, the material of which they consist must not have a tendency towards stress fractures which can be triggered by the stored or conducted products, or by environmental influences.

SUMMARY

It is an object of the present invention to provide a plastic body for storing or conducting a medical, diagnostic, pharmaceutical or/and cosmetic product, which fulfils the demands made on it with respect to transparency, permeability, mechanical stability and/or other appropriate characteristics, with a reduced probability of failing.

The invention addresses the object by providing a plastic body with a multi-layered structure. At least a first layer of the plastic body is formed by a plastic material which is selected from the point of view of a high resistance to stress fractures and therefore is referred to in the following as the stress fracture resistant plastic material. The plastic body comprises at least a second layer which is connected to the first layer. The plastic body defines or forms a hollow space in which the product is stored or through which it is conducted.

In some embodiments, the present invention comprises a multi-layered plastic body for storing, containing or conducting a medical, diagnostic, pharmaceutical, cosmetic or other product, the plastic body including a first layer made of a stress fracture resistant plastic material, and at least a second layer adjacent to the first layer and made of a plastic material exhibiting a lower resistance to stress fractures than the first plastic material. In some embodiments, the body is or forms part of a container, an ampoule, a catheter or a component of a fluid system which serves to conduct fluid. The invention encompasses a suitable method of making the body.

In some preferred embodiments, the at least two layers are connected to each other in a material lock. If the plastic body comprises more than two layers arranged one above the other, then in such embodiments, each of these layers is preferably connected in a material lock to each layer immediately bordering it above or below. The two or more layers can also be connected in a purely positive lock. A merely positive-lock connection is likewise considered, in particular in sandwich injection molding (co-injection), one preferred method of manufacture. The connection can furthermore be a positive-lock connection and a material-lock connection. Also, the possibility is also not to be excluded that the connection also partially has the character of a frictional lock, wherein however manufacture is directed either to a material lock or a positive lock or a combination of a material lock and a positive lock. Even in purely positive-lock connections between more than two layers, the positive-lock connections can exist only in pairs between layers immediately bordering each other, as described respectively above for the material-lock connection.

In principle, not all the layers of the plastic body have to enclose the hollow space, although this may be preferred in some embodiments. Thus, in some embodiments, for example, one of the layers can form a hollow space wall in a first region of the plastic body and another layer can form a hollow space wall in another region of the plastic body. In some preferred embodiments, at least the first layer made of the stress fracture resistant plastic material completely encloses the hollow space, except for one of more openings, in order to obtain the necessary impermeability for conducting or storing the product.

The product to be handled may preferably be a medical, diagnostic, pharmaceutical or cosmetic product. Examples of pharmaceutical products are insulin for diabetes therapy, growth hormones or rinsing liquids for dialysis. Rinsing liquids are furthermore used in diagnostics, in order to rinse body fluid from the human body by way of perfusion and, for example, to make it more accessible in order to identify and/or quantify constituents of the body fluid. Cosmetic products are often gelatinous, for example as creams or ointments. Although the plastic body in accordance with the invention is primarily intended to serve in handling fluid products, comparable problems are always present when storing products in the form of lozenges, tablets and the like, such that allocating such products is not to be ruled out.

The invention is based on the recognition that the various properties which are demanded of containers, catheters and other components of fluid systems, in particular in the medical field including the diagnostic field, cannot be fulfilled by a single plastic material, at least not optimally. For instance, the group of semi-crystalline plastics, exceptions aside, exhibit a sufficient resistance to stress fractures. The stress fracture resistant plastic material of the first layer may preferably be selected from this group. However, semi-crystalline plastics are mostly not transparent but opaque. Also, their mechanical stability and dimensional stability do not satisfy the demands of most applications. If, in a given application or use, a particular fluid or other substance or a group of fluids and/or other substances, for example atmospheric oxygen, alcohol or sebaceous matter, can be identified as the main cause of stress fractures, the stress fracture resistant plastic material is selected such that it is stress fracture resistant against the main cause, or more preferably against a number of stress fracture causes as applicable.

In some embodiments, the first layer is preferably formed from one of the following semi-crystalline, stress fracture resistant plastic materials or a combination of said materials: acetal, fluorocarbon, nylon, polyethylene, polypropylene, polybutylene, PETP, PBT, PPS, PEEK, EVA, polymethylpentene.

In preferred exemplary embodiments, the plastic material selected from the point of view of a sufficient, preferably as high as possible, resistance to stress fractures forms a thin outer layer which is preferably sufficiently thin that in comparison with the thickness of the plastic body shell as a whole, it only forms a skin. The stress fracture resistant plastic material forms either an outer surface of the plastic body which is in contact with the environment, for example the air, or an inner surface of the plastic body which is in direct contact with the product or at least points to the product if there is no direct contact. In preferred exemplary embodiments, the thickness of the first layer is sufficiently small that the first layer exhibits a sufficient permeability to light, as is required for storing or conducting products, in particular in medical and pharmaceutical applications, in order to be able to optically verify the amount and/or quality of the product in question. For these purposes, in some embodiments, the thin first layer is transparent or at least translucent, even though the plastic as such would be opaque, given a larger layer thickness.

In one particularly preferred embodiment, the second layer—or a number of different plastic layers which can be formed from different plastic materials, each fulfilling a different function—is/are arranged between two layers, each made of a stress fracture resistant plastic material. One of these two outer layers is in contact with the environment—in most applications, the atmospheric environment—and the other outer layer preferably comprises an innermost shell layer which forms a surface to the product or, if the product is a fluid, is preferably in direct contact with the product fluid.

In applications in which the product is to be or has to be protected from light, the second layer may preferably be impermeable to light and, as mentioned, can advantageously be arranged between two stress fracture resistant outer layers.

Another function which, in preferred applications or uses, is demanded of containers, catheters and the like is that of a diffusion barrier. For such applications, the plastic body should therefore have as low a permeability as possible for the relevant substance in the respective application. Substances which are to be kept from penetrating can in particular be the components of gases, such as oxygen and nitrogen from the environmental air. For use in a humid environment or in the human body, it can also be necessary to form a diffusion barrier against substances contained, for example suspended or dissolved, therein. In some embodiments, the plastic body is preferably formed such that the product or individual substances forming the product are also prevented from escaping. In preferred exemplary embodiments, which depend on a low permeability of the plastic body, the plastic body comprises a layer acting as a diffusion barrier. This layer can be formed by the second layer. It can equally be formed by another, third layer or in principle also by the first layer, if the stress fracture resistant plastic itself already exhibits the necessary, low permeability with respect to the substance or number of substances to be prevented from diffusing.

Reference may also be made to the fact that in many applications or uses, high demands are often made on the stability and dimensional stability of the components used therein, demands which cannot be achieved or are difficult to achieve using stress fracture resistant plastic materials. For such applications as well, at least two different plastic materials can be combined to form a plastic body comprising a stress fracture resistant first layer and a second layer made of the other plastic material which fulfils the demands made on mechanical stability and/or dimensional stability.

In some embodiments of the present invention, a functional layer can be provided for fulfilling each of different functions, in particular the above-cited functions with respect to transparency and/or permeability and/or mechanical stability and/or dimensional stability and/or other appropriate characteristics. It is, however, also possible for a number of the cited functions to be fulfilled by a single layer, respectively.

In some embodiments, the plastic body of the present invention is preferably a container, a catheter or a component in a fluid guiding system, for example a connecting element for connecting two catheters or a so-called catheter head, or a part of such a component. The plastic body can also be a casing or a casing part of an apparatus, for example an injection apparatus or an infusion apparatus. Although such a casing should not have contact with the product to be administered, for example insulin, it is however always possible for the product to come into contact with the casing and act so as to trigger stress fractures.

In medical applications, it can therefore also be advantageous to provide an entire casing or only a particularly critical casing part with a stress fracture resistant outer skin, wherein in the above-cited example, the stress fracture resistant plastic material of the outer skin exhibits the resistance to stress fractures with respect to the product.

In some embodiments, the plastic body is preferably produced by multiple-component injection molding, such that immediately during molding, the material lock and/or positive lock between the at least two layers of a wall in accordance with the invention is already established. A particularly preferred method for manufacturing the plastic body is the co-injection method, also referred to as sandwich multiple-component injection molding. The method is known in principle from other fields, but in accordance with the invention—using a stress fracture resistant plastic material—is profitably employed for manufacturing a plastic body for handling healthcare and beauty care products. By means of this method, the multiple layers of the plastic body are molded simultaneously or in immediate succession in an injection molding die. The layers can also be formed by being simultaneously injected during one injection phase and successively injected during another phase. The plastic body or a part of it can, instead, also be produced as a composite injection molded part. Furthermore, combining composite injection molding and co-injection multiple-component injection molding is a preferred mode of manufacture.

Reference may also be made to the fact that co-extrusion may also be a preferred method of manufacture, in particular when the plastic body is a catheter.

Co-injection or sandwich multiple-component injection molding is advantageous, in particular when the second layer is to be completely surrounded, or at least surrounded on both main outer areas, with the stress fracture resistant plastic material of the first layer, corresponding to some preferred embodiments.

When selecting the plastic materials, the plastic material best suited to achieving the required resistance to stress fractures is selected in a first step. In the next step, the plastic material for the second layer is selected in accordance with the criteria of transparency, mechanical stability, dimensional stability, suitability as a diffusion barrier, other appropriate characteristics, or a combination of a number of criteria. If a number of criteria are to be fulfilled and the plastic material for the second layer does not satisfy the requirements with respect to one of the number of criteria, then another, third plastic material is selected in a third step or also in yet other, subsequent steps, in order to close the gap still remaining. The selection process is continued until the demands made on the plastic body are fulfilled by the selected combination of materials, one plastic material per criterion if necessary. The plastic body is then molded, preferably in a co-injection method, the result of which is a multiple-component plastic, layered, sandwich-like body.

Both the plastic material for the first layer and the plastic material for the second layer are injected into the injection mold. If other plastic materials are also used, this preferably applies to them also.

The invention is explained below by way of exemplary embodiments shown in the Figures. Features disclosed by the exemplary embodiments, each individually and in any combination of features including any combination of features formed from multiple exemplary embodiments, i.e., a combination of one or more features of one embodiment with one or more features of another embodiment, address and reflect the objects of the present invention.

BRIEF DESCRIPTION OF THE DRAWINGS

FIG. 3 depicts an ampoule formed by co-injection multiple-component injection molding;

FIG. 4 depicts an ampoule formed by composite injection molding; and

FIG. 5 depicts a section of a co-extruded catheter.

DETAILED DESCRIPTION

Figure 1:
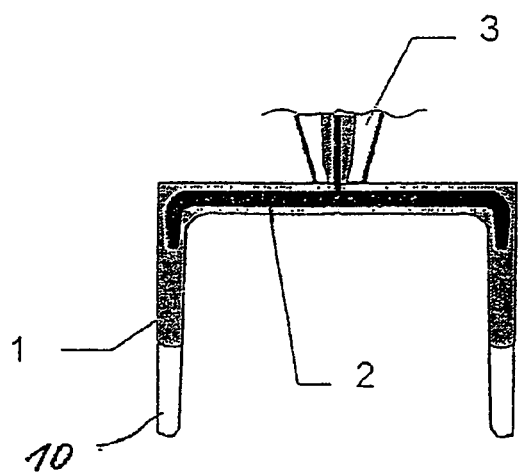
FIG. 1 depicts the manufacture of a multi-layered plastic body by co-injection multiple-component injection molding.

FIG. 1 depicts an embodiment of the present invention, particularly the manufacture of a multi-layered plastic body 4 by way of co-injection multiple-component injection molding. Plastic material is injected in through an injection nozzle 3 of an injection molding die, into an injection mold of the die. In a first injection phase, a stress fracture resistant plastic material, which is preferably semi-crystalline when hardened with a proportion of the crystalline phase of preferably at least 30% by weight, is injected in through the injection nozzle 3, in order to form an outer layer 1 until the mold is partially filled. The partial fill is indicated by the fact that a hollow cross-section 10 of the mold is initially filled, in a region away from the injection nozzle 3, only with the plastic material forming the outer layer. Before the hollow cross-section 10 with the plastic material forming the outer layer 1 is completely filled, a different, second plastic material is injected into the mold in a second injection phase, in order to form a second layer 2. In the depicted, exemplary embodiment, the second layer 2 is a core layer which is completely enclosed in the plastic material of the outer layer 1. The two plastic materials are injected in co-axially through the same injection nozzle 3, the material of the outer layer 1 surrounding that of the second layer 2. During the second injection phase, in which the two plastic materials are simultaneously injected in, the hollow cross-section 10 of the mold is filled, such that the layer structure shown in FIG. 2 results for the plastic body 4. At the end of the injection process, the supply of the plastic material for the second layer 2 can be discontinued and once again only the material of the outer layer 1 injected in, in order to also obtain a closed outer layer 1 in the region of the injection nozzle 3.

Figure 2:
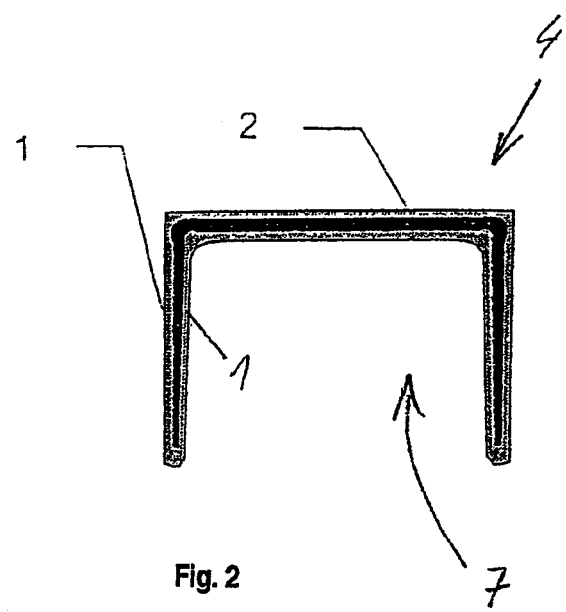
FIG. 2 depicts the plastic body after removal from the injection molding die depicted in FIG. 1.

FIG. 2 shows the plastic body 4 after being removed from the injection mold of FIG. 1. The plastic body 4 forms a simple, cylindrical crucible, open to one side, for storing liquids or other material. Clearly, shapes other than cylindrical may be produced by suitable molds and/or molding processes.

FIG. 3 shows a container 5—in this exemplary embodiment, an ampoule—for storing a liquid active agent solution, for example insulin, a growth hormone or the like. The ampoule 5 comprises a core layer 2 enclosed in an outer layer 1. As in the container 4 of FIGS. 1 and 2, a three-layered structure results, as viewed from the inside out, with the same inner and outer thin outer layer 1 respectively, and the comparatively thicker core layer 2. The description of the exemplary embodiment of FIGS. 1 and 2 apply to the layers 1 and 2, but they may have other or different suitable or appropriate characteristics as well. The ampoule 5 comprises an opening 6 which is sealed sterilely, in particular air-tight, by a septum 8. The septum 8 can be pierced by a needle without difficulty and after the needle has been removed, re-seals the former piercing point. Since such septa are sufficiently known in ampoules for medical and pharmaceutical applications, a more detailed description is omitted.

In some embodiments, the septum 8 can be a prefabricated plastic body which is placed in the mold before the injection molding process, and during injection is injection-coated with the two other plastic materials as shown by means of co-injection, as described by way of the exemplary embodiment of FIGS. 1 and 2. The septum 8 can, however, also be molded in the injection mold by injecting a plastic material provided for this purpose into the injection mold, simultaneously or immediately before or after injecting the other plastic materials. In this case, the ampoule 5 including the septum 8 is obtained by means of a combination of co-injection multiple-component injection molding and composite injection molding, wherein the two-component ampoule 5 is obtained by way of co-injection and the seal for the opening 6 is obtained by way of composite injection molding.

The ampoule of FIG. 3 is open at its end opposite the opening 6, by simply tapering hollow-cylindrically. In this embodiment, it is already directly suitable for use as an ampoule for an injection apparatus or infusion apparatus, since a piston serving to deliver the product generally seals the ampoule 5, product-tight, at its open end in such applications.

FIG. 4 shows an ampoule 10 which is identical in shape to the ampoule 5 of the exemplary embodiment of FIG. 3 and, in particular, can also be applied to the cited application or use as an ampoule for an injection apparatus or infusion apparatus.

As opposed to the ampoule 5, however, the ampoule 10 is formed as a composite injection molded part. Moreover, it also does not comprise a stress fracture resistant outer layer, but only the stress fracture resistant inner layer 1. While the multiple plastic components are injected in simultaneously or at least quasi-simultaneously in co-injection, in composite injection molding the multiple plastic components are introduced sequentially and through at least one individual nozzle for each of the plastic materials.

As the complexity of the shape of the plastic body and/or the number of layers increases, it can become advantageous or even necessary, both in co-injection and in composite injection molding, to use two or more injection nozzles at suitable points, instead of a single injection nozzle. It can be equally advantageous to inject one or more of the plastic materials in by means of an individual nozzle, or by means of an individual nozzle in each case. Thus, for example, the septum 8 of the exemplary embodiments of FIGS. 3 and 4 can be injected into the mold by means of a separate injection nozzle 3 provided specifically for the material of the septum 8, while the layers 1 and 2 are injected in by one or more injection nozzles in conjunction, as in the exemplary embodiments of FIGS. 1, 2 and 3, or sequentially as in the exemplary embodiment of FIG. 4.

FIG. 5 is a longitudinal section of another embodiment of the present invention, namely a catheter 11 co-extruded from two plastic materials. One of the plastic materials forms a thin stress fracture resistant outer skin 1 and the other forms an inner layer 2 which comes into contact with the product to be conducted.

In the foregoing description, embodiments of the present invention, including preferred embodiments, have been presented for the purpose of illustration and description. They are not intended to be exhaustive or to limit the invention to the precise forms or steps disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to particular contemplated uses. All such modifications and variations are within the scope of the invention as determined by the appended claims when interpreted in accordance with the breadth they are fairly, legally, and equitably entitled.

The invention claimed is:

1. A multi-layered plastic body contains a medical, diagnostic, pharmaceutical or/and cosmetic product, said plastic body comprising:
   a first layer made of a stress fracture resistant plastic material;
   at least a second layer made of a plastic material which exhibits a lower resistance to stress fractures than said first plastic material; and
   a septum;
   wherein the first layer and the second layer are joined by a connection, the connection established by a multiple-component injection molding process in which the first layer and second layer are injected into an injection mold of a die through at least one injection nozzle of the injection mold; and
   wherein the septum is coupled by a material join to the first and second layers, the material join established by placing the septum in the injection mold before delivering the first and second plastic materials, wherein during delivery of the first and second plastic materials, the septum is injection-coated with the first and second plastic materials to form the material join.

2. The plastic body as set forth in claim 1, wherein at least the first layer encloses a hollow space formed by the plastic body.

3. The plastic body as set forth in claim 1, wherein the first layer forms an outer layer of the plastic body, thereby forming a skin.

4. The plastic body as set forth in claim 1, wherein the plastic material of the second layer exhibits at least one of or a combination of a greater transparency to light from the visible spectrum, a greater mechanical stability, a greater dimensional stability and a lower permeability than the stress fracture resistant plastic material of the first layer.

5. The plastic body as set forth in claim 1, wherein the second layer is arranged between the first layer and another layer made of one of the same or another stress fracture resistant plastic material.

6. The plastic body as set forth in claim 1, wherein the first layer is connected to the second layer in a material lock.

7. The plastic body as set forth in claim 1, wherein the first layer is connected to the second layer in a positive lock.

8. The plastic body as set forth in claim 1, wherein the multiple-component injection molding process establishing the connection comprises a co-injection multiple-component injection molding process.

9. The plastic body as set forth in claim 1, wherein the multiple-component injection molding process establishing the connection comprises a composite injection molding process.

10. The plastic body as set forth in claim 1, wherein the multiple-component injection molding process establishing the connection comprises sequentially combining multiple-component injection molding and composite injection molding.

11. The plastic body as set forth in claim 1, wherein the plastic body is at least part of a container, the container being one of a group comprising ampoules, catheters or components of a fluid-handling system.

12. The plastic body as set forth in claim 11, wherein the plastic body is generally cylindrical, defines a hollow space, and comprises at least one opening at each of two opposing ends, said openings being provided in general axial alignment.

13. The plastic body as set forth in claim 1, wherein the stress fracture resistant plastic material is semi-crystalline.

14. The plastic body as set forth in claim 13, wherein the stress fracture resistant plastic material has a crystalline proportion of at least 30% by weight.

15. An injection molding method for manufacturing a multi-layered plastic body contains a medical, diagnostic, pharmaceutical, cosmetic or other product, comprising:
   delivering, in a first injection phase, a stress fracture resistant first plastic material through an injection nozzle until an injection mold is partially filled;
   delivering, in a second injection phase, a second plastic material, which exhibits a lower resistance to stress fractures than said first plastic material, into the injection mold to form a core layer enclosed by the first plastic material;
   wherein the first and second plastic materials are introduced into an injection mold and molded into said plastic body by way of one of co-injection molding, composite injection molding or a combination of these two molding methods, such that the first plastic material forms a first, outer layer of the plastic body and the second plastic material forms a second, core layer of the plastic body providing a septum coupled by a material join to the first and second layers; and wherein the injection molded plastic body is at least part of a container, the container being one of a group comprising ampoules, catheters or components of a fluid-handling system.

16. The method as set forth in claim 15, wherein the plastic material of the first layer and the plastic material of the second layer are injected into an injection mold of a die through at least one injection nozzle of the injection mold in one of immediate succession or at least intermittently in conjunction.

17. The method as set forth in claim 15, further comprising delivering, before the first injection phase, a plastic material in an area of the injection mold corresponding to a septum area for forming a septum, wherein the septum is formed by composite injection molding and the remainder of the plastic body is formed by co-injection multiple-component injection molding.

18. The method as set forth in claim 15, wherein during the second injection phase, the first and the second plastic material are injected in the injection mold co-axially through the same injection nozzle.

19. The method as set forth in claim 18, wherein at the end of the second injection phase, the delivering the second plastic material is terminated, and the first plastic material is injected into the injection mold to form an outer layer of the first plastic material in a region proximate the injection nozzle.

* * * * *